United States Patent
Tsukakoshi et al.

(10) Patent No.: US 6,294,257 B1
(45) Date of Patent: Sep. 25, 2001

(54) CONDUCTIVE ELASTOMER FILM, METHOD FOR PRODUCTION THEREOF, AND CONDUCTIVE ELASTOMER COMPOSITION

(75) Inventors: Kenji Tsukakoshi, Yamanashi; Shuichi Akita, Kawasaki; Kuniaki Goto, Tokyo, all of (JP)

(73) Assignees: Zeon Corporation; Zeon Kasei Co., Ltd., both of Tokyo (JP)

( * ) Notice: Subject to any disclaimer, the term of this patent is extended or adjusted under 35 U.S.C. 154(b) by 0 days.

(21) Appl. No.: 09/380,846

(22) PCT Filed: Mar. 11, 1998

(86) PCT No.: PCT/JP98/01021

§ 371 Date: Sep. 10, 1999

§ 102(e) Date: Sep. 10, 1999

(87) PCT Pub. No.: WO98/40435

PCT Pub. Date: Sep. 17, 1998

(30) Foreign Application Priority Data

Mar. 11, 1997 (JP) .................................................. 9-074583

(51) Int. Cl.$^7$ ..................................................... C08L 21/00
(52) U.S. Cl. .......................... 428/400; 428/147; 428/323; 428/340; 428/357; 428/363; 428/367; 428/402; 428/407; 428/447; 428/473.5; 427/180; 427/202
(58) Field of Search .................................... 427/180, 202; 428/147, 323, 340, 357, 363, 367, 400, 402, 407, 447, 473.5

(56) References Cited

U.S. PATENT DOCUMENTS 4,731,282 * 3/1988 Tsukagoshi et al. .

FOREIGN PATENT DOCUMENTS

| 2174210A | 7/1990 | (JP) . |
| 4240708A | 8/1992 | (JP) . |
| 5299296A | 11/1993 | (JP) . |
| 8-106816A | 4/1996 | (JP) . |
| 10-4033A | 1/1998 | (JP) . |
| 10-4034A | 1/1998 | (JP) . |

* cited by examiner

*Primary Examiner*—Richard Weisberger
(74) *Attorney, Agent, or Firm*—Birch, Stewart, Kolasch & Birch, LLP

(57) ABSTRACT

An electrically conductive elastomer film comprising (i) a thermoplastic elastomer and (ii) 5 to 100 parts by weight, based on 100 parts by weight of the thermoplastic elastomer, of an electrically conductive filler, and having a volume resistance of 0.1 to 5 Ωcm as measured in the direction perpendicular to the film plane. This film is produced by a casting process wherein a releasable base is coated with a solution prepared by dissolving or dispersing 5 to 30 parts by weight of the sum of a thermoplastic elastomer and an electrically conductive filler in 100 parts by weight of an organic solvent; the thus-formed coating is dried; and then the thus-formed film is released from the releasable base.

23 Claims, No Drawings

CONDUCTIVE ELASTOMER FILM, METHOD FOR PRODUCTION THEREOF, AND CONDUCTIVE ELASTOMER COMPOSITION

This application is the national phase under 35 U.S.C. § 371 of PCT International Application No. PCT/JP98/01021 which has an International filing date of Mar. 11, 1998, which designated the United States of America.

TECHNICAL FIELD

This invention relates to an electrically conductive elastomer film, which is useful as various conductive materials, electromagnetic waves shields and electrodes, especially to an electrically conductive elastomer film, which is useful as conductive collectors and electric double-layer capacitors. More particularly, it relates to an electrically conductive film, which has a small volume resistivity, and is useful as electromagnetic wave-shielding conductive collector materials in an electronic circuitry, and for an electric double-layer capacitor having a reduced internal resistance.

BACKGROUND ART

A conductive rubber material composed of a rubber material and an electrically conductive material is used as a flexible conductive material for various electric and electronic parts. Especially, a conductive elastomer film is used for a conductive collector, an antistatic material, an electromagnetic wave-shielding material, an electrode, a connector, a sensor and a heating element, and a conductive elastomer film having a more reduced electric resistance is desired for these applications.

Electronic circuits occasionally make a wrong operation because noises are generated from irradiation with electromagnetic waves produced by the circuits themselves or by external factors. Therefore, in order to minimize the influence of electromagnetic waves, in most electronic circuits, each unit circuit or the whole apparatus having the electronic circuits is covered by a conductive electromagnetic wave-shielding material. As the electromagnetic wave-shielding material, metal cases or metal covers are generally used. However, the metal cases or metal covers have a large size and a special shape such that they can be provided so as not to be in contact with circuit parts, and large spacings are kept between the circuit parts. Especially, in portable electronic instruments, which are required to be small in size and lightweight, electronic circuits are packaged therein in close vicinity to each other, and thus, thin and pliable electrically-conductive film materials are desired as substitutes for the metal shielding material.

An electric double-layer capacitor is an electric element comprising a polarizable electrode and an electrolyte, and, as the electrolyte, an electrolytic solution of an electrolyte salt is generally used [Japanese Unexamined Patent Publication (hereinafter abbreviated to "JP-A") S49-68254 and others]. The electric double-layer capacitor has a function of storing an electric charge in an electric double-layer formed between the electrode and an electrolyte by the polarization of the electrode. The electric double-layer capacitor is used as a small-size electric source for back-up semiconductor memory and others, which are required to be smaller in size and more high-performance. The electric double-layer capacitor is expected to be used as an auxiliary power source for an electric vehicle and a fuel cell vehicle.

The double-layer capacitors heretofore used are classified into two types: the first type using an aqueous electrolyte, usually aqueous sulfuric acid solution having a concentration of about 25 to 50% by weight (for example, JP-A S62-268119, JP-A S63-213915 and JP-A H2-174210) and the second type using an organic solvent electrolyte (JP-A S49-68254 and JP-A H7-86096). In general, an organic solvent electrolyte has a high output voltage, but it has a low ionic conductivity, and thus, results in increase of internal resistance and reduction of output current. In contrast, an aqueous electrolyte has a low voltage, but it has a high ionic conductivity, and thus, results in reduction of internal resistance and increase of output current.

In addition, an electric double-layer capacitor using an organic solvent electrolyte is combustible, and thus, an electric double-layer capacitor using an aqueous electrolyte and having a high output is desired from a safety viewpoint.

In a large electric source having an electric double-layer capacitor using an aqueous electrolyte and a plurality of cells arranged in series or parallel, if it is intended to enhance the output power, the internal resistance must be reduced to increase the output current. The internal resistance occurs due to the aqueous electrolyte, carbon of the electrode, conductive collector and other factors. The internal resistance occurring due to the aqueous electrolyte and carbon of the electrode can be lowered by reducing the thickness of cells, but the thinning of cells leads to reduction of cell capacity. Therefore it is very effective to reduce the volume resistance of the conductive collector.

As the collector, rubber films containing an electrically conductive material are generally used (for example, JP-A H2-174210, JP-A H4-240708 and JP-A H5-299296). However, the conventional conductive rubber films have a volume resistance of about 8 to 500 Ωcm as measured in the direction perpendicular to the film plane, and thus, it is difficult to enhance the output power of the capacitor. In addition, the conventional conductive rubber films have a poor acid resistance and, when the capacitor is used for a long period, the rubber films are eroded, and their function is reduced and leakage of electrolyte is liable to occur.

A conductive sheet having a conductive rubber layer having a volume resistance not larger than 10 Ωcm and comprising a polymer and carbon black is described in JP-A H8-106816. As specific examples of the polymer, there can be mentioned butyl rubber, halogenated butyl rubber and ethylene-propylene copolymer rubber. These polymers generally have a problem such that, when a large amount of carbon black is incorporated, they exhibit a poor solubility in a solvent, and, a conductive film having a high uniformity is difficult to produce from the polymer solution. Thus, a conductive film, which is homogeneous and has a low volume resistance as measured in the direction perpendicular to the film plane, is difficult to produce. Further, a conductive film having good mechanical strengths and good resistance to gas permeability also is difficult to produce from these polymer.

DISCLOSURE OF THE INVENTION

A primary object of the present invention is to provide an electrically conductive elastomer film having a reduced resistance, which are used as a conductive collector for electric and electronic parts, and an antistatic material, and are especially suitable for an electromagnetic waves-shielding member of an electronic circuit part or instrument, and a collector of an electric double-layer capacitor having an internal resistance.

In one aspect of the present invention, there is provided an electrically conductive elastomer film (hereinafter abbreviated to "film" when appropriate) which comprises (i) at least one thermoplastic elastomer selected from thermoplastic vinyl aromatic hydrocarbon-conjugated diene copolymers and hydrogenation products thereof, and (ii) 5 to 100 parts by weight, based on 100 parts by weight of the thermoplastic elastomer, of an electrically conductive filler, and has a volume resistance of 0.1 to 5 Ωcm as measured in the direction perpendicular to the film plane.

In another aspect of the present invention, there is provided an electrically conductive elastomer composition comprising (i) the above-mentioned thermoplastic elastomer, (ii) 5 to 100 parts by weight, based on 100 parts by weight of the thermoplastic elastomer, of an electrically conductive filler, and (iii) 100 to 1,000 parts by weight, based on 100 parts by weight of the thermoplastic elastomer, of a solvent capable of dissolving the thermoplastic elastomer.

In a still another aspect of the present invention, there is provided a process for producing the above-mentioned electrically conductive thermoplastic elastomer film, characterized in that a releasable base is coated with the above-mentioned electrically conductive elastomer composition, the electrically conductive elastomer composition is dried, and then the thus-formed film is released from the releasable base.

BEST MODE FOR CARRYING OUT THE INVENTION

The invention will now be described by the following examples.

(1) Electrically Conductive Elastomer Film

The film of the invention comprises (i) at least one thermoplastic elastomer selected from thermoplastic vinyl aromatic hydrocarbon-conjugated diene copolymers and hydrogenation products thereof, and (ii) 5 to 100 parts by weight, preferably 10 to 80 parts by weight, and more preferably 20 to 70 parts by weight, based on 100 parts by weight of the thermoplastic elastomer, of an electrically conductive filler, and has a volume resistance of 0.1 to 5 Ωcm, preferably 0.1 to 3 Ωcm and more preferably 0.1 to 1 Ωcm as measured in the direction perpendicular to the film plane. If the amount of the conductive filler is too small, the volume resistance of the conductive elastomer film becomes too large. In contrast, the amount of the conductive filler is too large, the conductive elastomer film becomes difficult to produce.

The thickness of the film of the invention may be suitably determined depending upon the use and shape thereof, and is preferably at least 10 μm, more preferably at least 20 μm and most preferably at least 40 μm, and preferably not larger than 200 μm, more preferably not larger than 150 μm, and most preferably not larger than 100 μm. When the film thickness is too small, the film has a low mechanical strength and a poor utility. In contrast, when the film thickness is too large, the resistance is undesirably large.

An electrically conductive filler such as conductive carbon is easily and uniformly dispersed in the entirety of the conductive film of the invention, and therefore, the film of the invention is preferably produced by a casting method using a solvent. When the film is produced by a casting method, the conductive filler is not oriented in parallel to the film plane, and therefore, the volume resistance as measured in the direction perpendicular to the film plane can be lowered.

(i) Thermoplastic Elastomer

The thermoplastic elastomer used in the invention is selected from thermoplastic vinyl aromatic hydrocarbon-conjugated diene copolymers and their hydrogenation products. Of these, a thermoplastic vinyl aromatic hydrocarbon-conjugated block copolymer and its hydrogenation product are preferable. Of the vinyl aromatic hydrocarbon-conjugated diene block copolymer, a block copolymer composed of (a) block A predominantly comprised of at least two vinyl aromatic hydrocarbons and (b) block B predominantly comprised of at least one conjugated diene (hereinafter referred to as "vinyl aromatic block copolymer" when appropriate) is especially preferable, and a hydrogenation product of vinyl aromatic block copolymer is most preferable.

As examples of the vinyl aromatic hydrocarbon used as the raw material for the thermoplastic elastomer, there can be mentioned styrene, α-methylstyrene, o-methylstyrene, p-methylstyrene, p-t-butylstyrene, 1,3-dimethylstyrene, p-vinyltoluene, vinylnaphthalene and vinylanthracene. Of these, unsubstituted vinyl aromatic hydrocarbons such as styrene are preferable. Styrene is most preferable. These vinyl aromatic hydrocarbons may be used either alone or as a combination of at least two thereof.

As examples of the conjugated diene used as the raw material for the thermoplastic elastomer, there can be mentioned 1,3-butadiene, isoprene, 2,3-dimethyl-1,3-butadiene, 1,3-pentadiene and 1,3-hexadiene. Of these, butadiene and isoprene are preferable.

The vinyl aromatic block copolymers and their hydrogenation products, which are preferable thermoplastic elastomers used in the invention, may have either a linear or branched chain structure. Aromatic block copolymers having at least two blocks A and their hydrogenation products are more preferable. Block copolymers having styrene blocks at both ends thereof and hydrogenated olefin block or blocks, specifically hydrogenated conjugated diene block or blocks in the intermedial part are especially preferable in view of the breaking elongation and breaking strength. The aromatic block copolymers having at least two blocks A include, for example, those having a linear structure such as A-B-A, A-B-A-B and A-B-A-B-A, and those having a star-like branched structure represented by the formula $(A_nB_m)_pM$ (where n and m are integers of at least 1, p is an integer of at least 3, and M is residue of a polyfunctional coupling agent).

The content of vinyl aromatic hydrocarbon in the vinyl aromatic block copolymer or its hydrogenation product is in the range of 5 to 70% by weight, preferably 10 to 60% by weight. When the amount of vinyl aromatic hydrocarbon is too small, the resulting film has a poor strength. In contrast, when the amount of vinyl aromatic hydrocarbon is too large, the resulting film has a poor flexibility.

The content of vinyl bond in block B is not particularly limited, but is usually not larger than 90%, preferably 1 to 60% and more preferably 5 to 30%. When the vinyl content is too large, the film has a poor flexibility.

The molecular weight of the vinyl aromatic block copolymers and their hydrogenation products is not particularly limited, but, in view of the balance between the elongation and flexibility of film, it is preferably in the range of 10,000 to 1,000,000, more preferably 20,000 to 800,000 and most preferably 50,000 to 500,000 as expressed in terms of weight average molecular weight of polystyrene as measured by gel permeation chromatography using toluene.

The vinyl aromatic block copolymers can be produced by a known method, for example, methods described in Japanese Examined Patent Publication (hereinafter abbreviated to "JP-B") S36-19286, JP-B S43-17979, JP-B S45-31951 and JP-B S46-32415 wherein a vinyl aromatic hydrocarbon is copolymerized with a conjugated diene by using an organic lithium compound as an initiator in a hydrocarbon solvent. When the polymerization is conducted, a polar compound may be used for the purposes of, for example, adjusting the reactivity ratio of vinyl aromatic hydrocarbon and conjugated diene, modifying the microstructure of the conjugated diene portion of the block polymer, and adjusting the rate of polymerization.

As examples of the hydrocarbon medium solvent used, there can be mentioned aliphatic hydrocarbons such as butane, heptane, hexane, isopentane, heptane, octane and isooctane; alicyclic hydrocarbons such as cyclopentane, methylcyclopentane, cyclohexane, methylcyclohexane and ethylcyclohexane; and aromatic hydrocarbons such as benzene, ethylbenzene and xylene. These solvents may be used either alone or as a mixture of at least two thereof. The amount of the hydrocarbon solvent is usually such that the concentration of monomers is in the range of 1 to 50% by weight.

As examples of the polar compound, there can be mentioned ethers such as tetrahydrofuran, diethyl ether, anisole, dimethoxybenzene and ethylene glycol dimethyl ether; amines such as triethylamine, tetramethylenediamine, N-dimethylaniline and pyridine; thioethers; phosphines; phosphoramides; alkylbenzenesulfonic acids; and metal alkoxides such as sodium or potassium alkoxides. A suitable polar compound may be chosen depending upon the required properties. The amount of the polar compound varies depending upon the particular kind of compound, but is usually in the range of 0.001 to 1 mole, preferably 0.01 to 5 moles, per mole of the organic lithium compound.

The organic lithium compound include organic monolithium compounds and organic dilithium compounds. As specific examples thereof, there can be mentioned n-butyllithium, sec-butyllithium, tert-butyllithium, n-hexyllithium, isohexyllithium, phenyllithium, naphthyllithium, hexamethylene dilithium, butadienyl dilithium and isoprenyl dilithium. Generally organic monolithium compounds are used. These organic lithium compounds may be used either alone or as a combination of at least two thereof. The amount of the organic lithium compound varies depending upon the molecular weight of polymer and the kind of organic lithium compound, but is usually in the range of 0.001 to 1 mole, preferably 0.01 to 0.5 mole, per mole of the organic lithium compound.

The polymerization reaction may be either isothermic or adiabatic. Usually the reaction is conducted at a temperature range of 0 to 150° C., preferably 20 to 120° C.

The block copolymer used may be treated with a coupling agent after the completion of copolymerization.

As specific examples of the coupling agent, there can be mentioned metal compounds such as tin tetrachloride, tin dichloride, tin tetrabromide, silicon tetrachloride, silicon tetrabromide, silicon tetraiodide, germanium tetrachloride, lead dichloride, methyltrichlorosilane, dimethyldichlorosilane, butyltrichlorosilane, dibutyldichlorotin, bis(trichlorosilyl)ethane, bis(trichlorostanyl)ethane, tetramethoxysilane, tetramethoxytin, tetraethoxysilane, tetraethoxytin, tetrabutoxysilane and tetrabutoxytin; unsaturated nitriles such as ethylacrylonitrile, dihalogenated hydrocarbons such as dibromobenzene, dichlorobenzene and dibromoethylene; carboxylic acid esters such as dimethyl adipate, diethyl adipate, ethyl benzoate, dimethyl terephthalate, diethyl terephthalate and dimethyl isophthalate; carboxylic acid halides such as terephthaloyl chloride, phthaloyl chloride, isophthaloyl chloride and adipoyl chloride; and carbon tetrachloride. These coupling agents can be used either alone or as a combination of at least two thereof. The amount of the coupling agent is usually in the range of 0.25 to 2 equivalent, preferably 0.30 to 1.5 equivalent, based on the organic lithium compound. The coupling reaction is usually carried out at a temperature of 0 to 150° C. for 0.1 to 20 hours.

The block copolymer used may be treated with a modifier after the completion of copolymerization. The modifier includes, for example, unsaturated carboxylic acids such as maleic anhydride described in JP-B S62-61615, and imino compounds, cyanamide compounds, aziridinyl compounds and amide compounds described in JP-B H4-387770.

The thus-produced vinyl aromatic block copolymers including coupled products or modified products can be hydrogenated by a conventional method, for example, described in JP-A H4-96905, JP-A H4-96904, JP-B H1-53851, JP-B S63-5402. JP-B S48-3555 and JP-B S45-20504. Specifically, the vinyl aromatic block copolymer is dissolved in an inert solvent such as cyclopentanone or tetrahydrofuran, and then subjected to hydrogenation in the presence of a hydrogenation catalyst to give a hydrogenated vinyl aromatic block copolymer.

As examples of the hydrogenation catalyst, there can be mentioned hydrogenating metal catalysts such as nickel, platinum, palladium and rhodium, Raney nickel catalyst, organic nickel compounds, organic cobalt compounds and composite catalysts composed of these compounds with other organic compounds, which are supported on carbon or diatomaceous earth.

When the thermoplastic elastomer film of the invention is used as a conductive collector of an electric double-layer capacitor, it is most preferable to use a hydrogenated vinyl aromatic block copolymer as the thermoplastic elastomer because the hydrogenated vinyl aromatic block copolymer does not react with conventional acidic electrolytes.

Among the hydrogenated vinyl aromatic block copolymers, SEBS which is a hydrogenated product of a styrene-butadiene block copolymer and SEPS which is a hydrogenated product of a styrene-isoprene block copolymer are especially preferable.

The thermoplastic elastomer used in the present invention preferably has a tensile elongation at break of at least 50%, more preferably at least 100%, and a tensile strength at break of at least 20 kgf/cm$^2$, more preferably at least 40 kgf/cm$^2$. When the breaking tensile elongation is too small or the breaking tensile strength is too small, a conductive collector made of the elastomer tends to be broken by a gasket of a basic cell.

(ii) Electrically Conductive Filler

The electrically conductive filler contained in the conductive elastomer composition of the invention includes, for example, carbon, graphite, and powdery or fibrous metal or metal oxide. The electrically conductive filler preferably has a specific surface area of at least 20 m$^2$/g, more preferably at least 500 m$^2$/g. When the specific surface area is too small, the conductive elastomer exhibits an undesirably large volume resistance.

The carbon black includes, for example, furnace black such as conductive furnace black, super-conductive furnace black and extra-conductive furnace black, conductive channel black and acetylene black. As commercially available examples of the carbon black, there can be mentioned Continex CF® (conductive furnace black supplied by Continental Carbon Co.), KETJENBLACK EC® (conductive furnace black supplied by Ketjenblack International Co.), VULCAN C® (conductive furnace black supplied by Cabot Corp.), BLACK PEARLS® 2000 (conductive furnace black supplied by Cabot Corp.) and Denka Acetylene Black® (acetylene black supplied by Denki Kagaku Kogyou K.K.).

As specific examples of the graphite, there can be mentioned scaly natural graphite, artificial graphite and graphite fiber.

(2) Electrically Conductive Elastomer Composition

The electrically conductive elastomer composition of the invention comprises (i) 100 parts by weight of the above-mentioned thermoplastic elastomer, (ii) 5 to 100 parts by weight of the above-mentioned electrically conductive filler, and (iii) 100 to 1,000 parts by weight of a solvent capable of dissolving the thermoplastic elastomer. According to the need, various additives, a crosslinking agent and other ingredients may be incorporated in the conductive elastomer composition.

(iii) Solvent

The solvent used in the invention is not particularly limited provided that it is capable of dissolving the thermoplastic elastomer, and includes organic solvents, for example, aromatic solvents such as toluene, benzene and xylene, ether solvents such as tetrahydrofuran, ketone solvents such as acetone, methyl ethyl ketone and methyl isobutyl ketone, and chlorine-containing solvents.

(iv) Additives

According to the need, the elastomer composition of the invention may have incorporated therein additives such as a softening agent, for example, paraffinic process oil and naphthenic process oil, and an antioxidant, provided that the intended effect of the invention can be achieved.

Where the thermoplastic elastomer used in the invention has a relatively low strength, a reinforcing resin can be incorporated in addition to the elastomer and the additives. The resin used is preferably such that it is not attacked by an acidic electrolyte, and includes, for example, olefin resins such as polyethylene and polypropylene, polystyrene and polyvinyl chloride. Of these, polyvinyl chloride is especially preferable because of excellent acid resistance. The amount of the resin is preferably in the range of 0.1 to 50 parts by weight, more preferably 5 to 20 parts by weight, based on 100 parts by weight of the thermoplastic elastomer. When the amount of the resin is too small, the reinforcing effect is poor. In contrast, when the amount of the resin is too large, the film has a poor flexibility.

In order to enhance the strength of the conductive thermoplastic elastomer composition, a crosslinking agent may be incorporated in the elastomer composition, which is crosslinked after it is shaped into film General crosslinking agents such as sulfur, a sulfur donor, a quinone crosslinking agent, an organic peroxide and a resinous crosslinking agent can be adopted as the crosslinking agent. Where the elastomer composition is used for a collector of an electric double-layer capacitor using sulfuric acid as electrolyte, crosslinking agents not containing a metal compound such as zinc oxide are preferably used. As examples of the metal compound-free crosslinking agents, there can be mentioned a thiuram sole crosslinking agent such as tetramethylthiuram disulfide or tetraoctylthiuram disulfide, or a combination thereof with a sulfenamide such as N-cyclohexylbenzothiazolsulfenamide; a combined crosslinking agent of triazinethiol with benzothiazole; an organic peroxide sole crosslinking agent such as benzoyl peroxide, hydroperoxide, a dialkyl peroxide or a peroxyketal; and an ultraviolet curing agent. The amount of the crosslinking agent is usually in the range of 0.1 to 20 parts by weight, preferably 0.1 to 10 parts by weight, based on 100 parts by weight of the elastomer.

When the elastomer composition is shaped into film by the below-mentioned casting procedure using a solvent, it is not necessary to knead together the elastomer, the conductive filler and optional ingredients including conductive ingredients, resin and crosslinking agent, these ingredients can be separately dissolved or dispersed in a solvent when an elastomer solution for casting is prepared. When a crosslinking agent is used, if it is melt-kneaded together, it tends to cause crosslinking of the elastomer, and thus the film becomes difficult to make by a casting procedure. Therefore, the crosslinking agent is preferably incorporated directly in the elastomer solution for casting at the step of preparing said elastomer composition.

The electrically conductive elastomer composition of the invention is prepared by incorporating usually 5 to 30 parts by weight, preferably 10 to 25 parts by weight, and more preferably 15 to 20 parts by weight, based on 100 parts by weight of the organic solvent, of the total ingredients comprising the elastomer, the conductive filler, and optional ingredients including a conductive ingredient, a resin and a crosslinking agent. When the concentration of the incorporated ingredients is too low, the film is not sufficiently thick. In contrast. when the concentration of the incorporated ingredients is too high, the film thickness becomes non-uniform.

(3) Process for Producing Electrically Conductive Elastomer Film

The electrically conductive elastomer film of the invention is produced by a casting process using a solvent, namely, a process wherein a releasable base is coated with the above-mentioned elastomer composition of the invention, the elastomer composition is dried, and the thus-formed film is released from the releasable base. The production process will be more specifically described.

First, if desired, granular materials and non-dispersed materials in the electrically conductive elastomer composition of the invention are removed by filtration or other means. Filters used for filtration are not particularly limited, and include, for example, a net woven from fibrous yarn or metal wire, or a porous planar material having fine pores.

Then, if desired, the elastomer composition is deaerated to remove bubbles contained therein. The deaeration procedure is not particularly limited, and includes, for example, a vacuuming method and an ultrasonic irradiation method.

The thus-prepared solution of the elastomer composition is cast on a flat surface of a releasable base made of, for example, polyethylene terephthalate, tetrafluroethylene, paper, metal, glass sheet, polyester film and polyvinyl chloride film, by using a coater, for example, a bar coater, a T-die, a T-die with bar, a doctor knife, a Mayer bar, a roll coater or a die coater, by means of, for example, spraying, brushing, rolling, spinn-coating or dipping, to form a coating film with uniform thickness. When the as-made coating film has a thickness thinner than the desired thickness, the casting procedure can be repeated so that the film thickness reaches the desired value.

Then the coating film is dried usually at a temperature of about 30 to 150° C. to remove the solvent, and, if desired, cured to effect crosslinking at a temperature of about 130 to 180° C. for about 5 to 180 minutes whereby a film is formed which is then released from the base.

When the solvent is removed, the concentration of the residual solvent becomes not larger 5% by weight, preferably not larger than 2% by weight, more preferably not larger than 1% by weight and most preferably not larger than 0.5% by weight. If the drying is carried out at a temperature in the vicinity of or higher than the boiling point of the solvent, bubbles are occasionally formed and the film surface becomes rough. Therefore the drying temperature should preferably be determined depending upon the particular property of solvent, and be usually at least 5° C. lower, preferably at least 10° C. lower, than the boiling point of solvent, and is usually in the range of 30 to 100° C. If desired, the film released from the base can be again dried.

When a crosslinking agent is incorporated for curing, after the film is thoroughly dried to remove the solvent, the dried film is heated usually at a temperature of 130 to 180° C. for 5 to 180 minutes, preferably 10 to 120 minutes. If the curing temperature is too high, the crosslinking agent is occasionally decomposed before the degree of crosslinking reaches the desired extent. Therefore the crosslinking temperature should be determined depending on the property of crosslinking agent.

The curing can be carried out either immediately after the removal of solvent, or later. Where an electric double-layer capacitor is sealed by co-curing to adhere a gasket to a conductive collector made of the conductive elastomer film of the invention, as mentioned below, the crosslinking can be carried out after the fabrication of an electric double-layer capacitor.

An electric double-layer capacitor can be fabricated from the above-mentioned conductive elastomer film of the invention by the following procedure.

The electric double-layer capacitor includes not only that containing one basic cell, which is the minimum constituent unit, but also, that having a plurality of basic cells which are connected in series to enhance the output voltage, or connected in parallel to enhance the output current, or that having a plurality of basic cells which are connected both in series and in parallel.

The basic cell constituting the electric double-layer capacitor is fabricated by the steps of providing a pair of electrodes having a separator interposed between the electrodes; placing a conductive collector so that the collector surrounds the electrodes in the state of contact with the electrodes; filling an electrolyte within the space surrounded by the collector; and the thus-fabricated assembly is sealed with a gasket in a state such that at least part of the outer surface of the conductive collector is exposed. The separator is used for preventing shortcircuiting between the electrodes, and is made of a material capable of allowing passage of electrolyte through the material and retaining a sufficient amount of electrolyte therein, which material includes, for example, nonwoven fabric made of glass fiber, polypropylene fiber or polyethylene fiber, or a porous film. The electrodes used are polarizable electrodes having a high conductivity and incapable of causing an electrochemical reaction with the electrolyte. The electrodes are usually made of fixed carbon such as, for example, fixed carbon made by fixing an active carbon powder with a resin binder such as a phenol-formaldehyde resin or fluorine-containing resin. The fixation of active carbon can be carried out by a mechanical or physical method so as to provide a mechanically stable form. The electrolyte is an acidic solution, and an aqueous sulfuric solution having a concentration of about 25 to 50% by weight is usually used as the electrolyte because of non-volatility. The gasket used is not particularly limited provided that it is acid-resistant and leakage of electrolyte can be prevented, and usually, it is made of a material selected from the thermoplastic elastomers used in the invention and rubbers having an iodine value not larger than 30, preferably not larger than 20, for example, butyl rubber.

The electrically conductive elastomer film of the invention can also be used as magnetic waves-shielding film which is provided to prevent coupling between electronic circuits mounted on a printed-wiring board within the casing of a portable electronic instrument.

The invention will now be specifically described by the following examples of the invention and comparative examples. In these examples, the volume resistance of film was measured in the direction perpendicular to the film plane by using a low-resistance meter (3220 supplied by Hioki Electric Co.). The capacity was determined from the current change as measured when charging was conducted at a voltage of 2V and discharging was conducted until the voltage reached 0.8V.

EXAMPLE 1

100 Parts by weight of hydrogenated styrene-butadiene-styrene block copolymer (SEBS: KLAYTON G® G1650, styrene content: 29%, supplied by Shell Chemical Co.) and 50 parts by weight of conductive carbon (KETJENBLACK EC®, specific surface area: about 800 m²/g, supplied by Ketjenblack International Co. ) were incorporated in 600 parts by weight of toluene. The mixture was mixed together by using a ball mill to prepare a uniform slurry. The slurry was filtered by a metal net with a 150 mesh size to remove granular materials and non-dispersed materials, and then deaerated by a vacuum deaerator. The slurry was cast on a polyethylene terephthalate film, which had been treated with a releasing agent, by using an applicator. The coating was dried at 80° C. for 15 hours to give a uniform film having a thickness of 60 μm. The film had a tensile elongation at break of 400% and a tensile strength at break of 150kgf/cm², as measured according to JIS K6301. The volume resistance was 0.48Ωcm.

EXAMPLE 2

100Parts by weight of SEBS (TUFTEC H® H1052, styrene content: 20%, supplied by Asahi Chemical Ind. Co.) and 30 parts by weight of conductive carbon (KETJENBLACK EC®, specific surface area: about 800 M²/g, supplied by Ketjenblack International Co.) were incorporated in 600 parts by weight of toluene. The mixture was mixed together by using a ball mill to prepare a uniform slurry. The slurry was filtered by a metal net with a 150 mesh size to remove granular materials and non-dispersed materials, and then deaerated by a vacuum deaerator. The slurry was cast on a polyethylene terephthalate film, which had been treated with a releasing agent, by using an applicator. The coating was dried at 80° C. for 15 hours to give a uniform film having a thickness of 60 μm. The film had a tensile elongation at break of 700% and a tensile strength at break of 150 kgf/cm². The volume resistance was 0.60 Ωcm.

EXAMPLE 3

100 Parts by weight of hydrogenated styrene-isoprene-styrene block copolymer (SEPS, Septon® 2002, styrene content: 30%, supplied by Kuraray Co.) and 30 parts by weight of conductive carbon ("BLACK PEARLS®" 2000, specific surface area: about 1,475 m²/g, supplied by Cabot Co.) were incorporated in 600 parts by weight of toluene. The mixture was mixed together by using a ball mill to prepare a uniform slurry. The slurry was filtered by a metal net with a 150 mesh size to remove granular materials and non-dispersed materials, and then deaerated by a vacuum deaerator. The slurry was cast on a polyethylene terephthalate film, which had been treated with a releasing agent, by using an applicator. The coating was dried at 80° C. for 15 hours to give a uniform film having a thickness of 60 μm. The film had a tensile elongation at break of 550% and a tensile strength at break of 135 kgf/cm². The volume resistance was 0.40 cm.

EXAMPLE 4

Into the same slurry containing 100 parts by weight of SEBS, as prepared by mixing by a ball mill in Example 1, 4 parts by weight of triazinethiol and 4 parts by weight of N-cyclohexylbenzothiazolsulfenamide were incorporated. The thus-prepared slurry was filtered by a metal net with a 150 mesh size, and then deaerated. The slurry was cast on a polyethylene terephthalate film by using an applicator. The coating was dried at 80° C. for 10 minutes to give a uniform film having a thickness of 60 μm. The film was passed through heated rolls maintained at 180° C., and then heat-treated at 160° C. for 10 minutes. The film had a tensile elongation at break of 300% and a tensile strength at break of 200 kgf/cm². The volume resistance was 0.40 Ωcm. Thus, the film had a tenacity and a resistance, which were superior to those of the film made in Example 1.

COMPARATIVE EXAMPLE 1

100 Parts by weight of butyl rubber (BUTYL® 365, supplied by JSR Corp.), 20 parts by weight of conductive carbon (KETJENBLACK EC®, supplied by Ketjenblack International Co.), 2 parts by weight of a crosslinking agent (alkylphenol-formaldehyde resin, Tamanol® 531, supplied by Arakawa Chem. Co) and 2 parts by weight of tin dichloride dehydrate were kneaded together in a manner such that crosslinking does not occur. The kneaded mixture was subjected to calendering to form a conductive rubber film having a thickness of 220 μm. The film was maintained at 150° C. for 30 minutes to effect crosslinking. The film had a tensile elongation at break of 30% and a tensile strength at break of 45 kgf/cm². The volume resistance was 5.5 Ωcm.

Industrial Applicability

The electrically conductive elastomer film of the invention has good acid resistance, and thus is not readily deteriorated in an acidic electrolyte and exhibits a stable conductive property. The volume resistance as measured in the direction perpendicular to the film plane is small. Therefore, when the film is used as a conductive collector in an electric double-layer capacitor, the basic cell of the capacitor exhibits an enhanced durability, and the resistance of the basic cell is low and the capacity is large. Thus, where a plurality of basic cells are connected in series or in parallel, a battery having a stable high output can be fabricated.

Further, the conductive elastomer film can be used as, for example, a conductive film for a thin secondary battery; a material for multilayer piezoelectric actuator; conductive collector for, for example, an electric double-layer capacitor; antistatic material for, for example, a flooring material a wall material and a carrying box material for equipment of precision electronic parts; a magnetic waves-shielding material; electrodes, especially an elastomer composite electrode having good flexibility, an electrode for anode used in electrolytic solution, an electrode for soil, and an elastomer electrode for electroplating or electrometallurgy; and a connector, a squeegee for screen printing and a sheet-form ion sensor.

What is claimed is:

1. An electrically conductive elastomer film comprising (i) 5 to 70% by weight of at least one thermoplastic elastomer selected from the group consisting of thermoplastic vinyl aromatic hydrocarbon-conjugated diene block copolymers and hydrogenation products thereof, and (ii) 5 to 100 parts by weight, based on 100 parts by weight of the thermoplastic elastomer, of electrically conductive carbon having a specific surface area of 20 m²/g to 2,000 m²/g, said film having a volume resistance of 0.1 to 5 Ωcm as measured in the direction perpendicular to the film plane.

2. The electrically conductive elastomer film according to claim 1, which comprise 10 to 80 parts by weight, based on 100 parts by weight of the thermoplastic elastomer, of the electrically conductive carbon.

3. The electrically conductive elastomer film according to claim 1, which has a volume resistance of 0.1 to 3 Ωcm as measured in the direction perpendicular to the film plane.

4. The electrically conductive elastomer film according to claim 1, which has a volume resistance of 0.1 to 1 Ωcm as measured in the direction perpendicular to the film plane.

5. The electrically conductive elastomer film according to claim 1, which has a tensile elongation at break of 50 to 500%.

6. The electrically conductive elastomer film according to claim 1, which has a tensile strength at break of 20 to 1,000 kgf/cm².

7. The electrically conductive elastomer film according to claim 1, which has a thickness of 0.01 to 0.2 mm.

8. The electrically conductive elastomer film according to claim 1, which has a thickness of 0.02 to 0.15 mm.

9. The electrically conductive elastomer film according to claim 1, which has a thickness of 0.04 to 0.1 mm.

10. The electrically conductive elastomer film according to claim 1, wherein the thermoplastic vinyl aromatic hydrocarbon-conjugated diene block copolymer is composed of (a) at least two blocks A predominantly comprised of vinyl aromatic hydrocarbon and (b) at least one block B predominantly comprised of conjugated diene.

11. The electrically conductive elastomer film according to claim 1 or claim 10, wherein the vinyl aromatic hydrocarbon is styrene, and the conjugated diene is butadiene or isoprene.

12. An electrically conductive elastomer composition comprising (i) at least one thermoplastic elastomer selected from the group consisting of thermoplastic vinyl aromatic hydrocarbon-conjugated diene block copolymers and hydrogenation products thereof, (ii) 5 to 100 parts by weight, based on 100 parts by weight of the thermoplastic elastomer, of electrically conductive carbon having a specific surface area of 20 m²/g to 2,000 m²/g, and (iii) 100 to 1,000 parts by weight, based on 100 parts by weight of the thermoplastic elastomer, of a solvent capable of dissolving the thermoplastic elastomer.

13. The electrically conductive elastomer composition according to claim 11, which further comprises 0.1 to 20 parts by weight, based on 100 parts by weight of the thermoplastic elastomer, of a crosslinking agent.

14. The electrically conductive elastomer composition according to claim 11, wherein the crosslinking agent is selected from a combination of triazinethiol with benzothiazole, and an organic peroxide.

15. A process for producing an electrically conductive thermoplastic elastomer film, characterized in that a releasable base is coated with an electrically conductive elastomer composition as claimed in claim 11, the thus-formed coating of the electrically conductive elastomer composition is dried, and then the thus-formed film is released from the releasable base.

16. The process for producing an electrically conductive thermoplastic elastomer film according to claim 15, wherein a releasable base is coated with an electrically conductive elastomer composition, which is a solution prepared by dissolving or dispersing 5 to 30 parts by weight of the sum of a thermoplastic elastomer and the electrically conductive carbon in 100 parts by weight of an organic solvent, and filtering and deaerating the thus-prepared solution; the thus-formed coating of the electrically conductive elastomer composition is dried at a temperature of 30 to 100° C. to remove the solvent; and then the thus-formed film is released from the releasable base.

17. The process for producing an electrically conductive thermoplastic elastomer film according to claim 16, wherein the coating having been dried at a temperature of 30 to 100° C. is maintained at a temperature of 130 to 180° C. for 5 to 180 minutes whereby the elastomer is crosslinked, and then, the thus-formed film is released from the releasable base.

18. The electrically conductive elastomer film according to clam 1, wherein the said thermoplastic elastomer is a hydrogenated aromatic hydrocarbon-conjugated diene block copolymer.

19. The electrically conductive elastomer film according to claim 18 wherein the said hydrogenated aromatic hydrocarbon-conjugated diene block copolymer is composed of (a) at least two blocks A predominantly composed of a vinyl aromatic hydrocarbon and (b) at least one block B predominantly comprised of a hydrogenated conjugated diene.

20. The electrically conductive elastomer film according to claim 19 wherein the said hydrogenated aromatic hydrocarbon-conjugated diene block copolymer has a linear structure represented by the formula: A-B-A, A-B-A-B OR A-B-A-B-A, or a star-like branched structure represented by the formula: $(A_nB_m)_pM$, wherein A is a block of vinyl aromatic hydrocarbon, B is a block of hydrogenated conjugated diene, n and m are integers of at least 1, p is an integer of at least 3, and M is a residue of a polyfunctional coupling agent.

21. The electrically conductive elastomer film according to claim 11, wherein the thermoplastic vinyl aromatic hydrocarbon-conjugated diene block copolymer is composed of (a) at least two blocks A predominantly comprised of vinyl aromatic hydrocarbon and (b) at least one block B predominantly comprised of conjugated diene.

22. The electrically conductive elastomer film according to clam 11, wherein the thermoplastic elastomer is a hydrogenated thermoplastic vinyl aromatic hydrocarbon-conjugated diene block copolymer composed of (a) at least two blocks A predominantly comprised of vinyl aromatic hydrocarbon and (b) at least one block B predominantly comprised of hydrogenated conjugated diene.

23. The electrically conductive elastomer film according to claim 22, wherein the said hydrogenated aromatic hydrocarbon-conjugated diene block copolymer has a linear structure represented by the formula: A-B-A, A-B-A-B OR A-B-A-B-A, or a star-like branched structure represented by the formula: $(A_nB_m)_pM$, wherein A is a block of vinyl aromatic hydrocarbon, B is a block of hydrogenated conjugated diene, n and m are integers of at least 1, p is an integer of at least 3, and M is a residue of a polyfunctional coupling agent.

\* \* \* \* \*